(12) United States Patent
Himayat et al.

(10) Patent No.: US 9,036,473 B2
(45) Date of Patent: May 19, 2015

(54) CONTROL AND DATA PLANE SOLUTIONS FOR CARRIER-AGGREGATION BASED WLAN OFFLOAD

(75) Inventors: Nageen Himayat, Fremont, CA (US); Shilpa Talwar, Los Altos, CA (US); Kamran Etemad, Potomac, MD (US); Vivek G. Gupta, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/992,013

(22) PCT Filed: Dec. 21, 2011

(86) PCT No.: PCT/US2011/066651
§ 371 (c)(1),
(2), (4) Date: Jun. 6, 2013

(87) PCT Pub. No.: WO2012/148482
PCT Pub. Date: Nov. 1, 2012

(65) Prior Publication Data
US 2014/0050086 A1 Feb. 20, 2014

Related U.S. Application Data

(60) Provisional application No. 61/481,024, filed on Apr. 29, 2011.

(51) Int. Cl.
*H04L 1/00* (2006.01)
*H04L 12/26* (2006.01)
(Continued)

(52) U.S. Cl.
CPC ............ *H04L 5/0053* (2013.01); *H04B 7/0465* (2013.01); *H04B 7/0478* (2013.01);
(Continued)

(58) Field of Classification Search
CPC . H04L 47/10; H04L 12/5695; H04L 47/2441; H04L 45/00; H04L 45/12; H04Q 11/0478; H04W 80/04; H04W 88/06
USPC .......................... 370/230, 231, 235, 237, 328
See application file for complete search history.

(56) References Cited

U.S. PATENT DOCUMENTS

2005/0181776 A1  8/2005  Verma et al.
2006/0092955 A1*  5/2006  Durbin et al. ................. 370/401
(Continued)

FOREIGN PATENT DOCUMENTS

WO  WO-2012121757 A1  9/2012
WO  WO-2012148482 A1  11/2012

OTHER PUBLICATIONS

"International Application Serial No. PCT/US2011/066651, Search Report mailed Sep. 12, 2012", 3 pgs.
(Continued)

*Primary Examiner* — Ronald Abelson
(74) *Attorney, Agent, or Firm* — Schwegman Lundberg & Woessner, P.A.

(57) ABSTRACT

Systems and methods for controlling data traffic offload to a WLAN (e.g., a Wi-Fi network) from a WWAN (e.g., a 4G LTE network) are generally disclosed herein. One embodiment includes data traffic offload techniques managed by a Radio Resource Control (RRC) in a networked device including offloading data at the IP, PDCP, RLC, or MAC layers; another embodiment includes data traffic offload techniques managed by a MAC Scheduler with RRC control. Configurations for multimode user equipment (UE) and multimode base stations are also described herein, including configurations for implementing a Multiple Radio Access Technology (Multi-RAT) aggregation function to offload data from a WWAN to a WLAN and transmit the data via the WLAN using a Layer 2 transport.

9 Claims, 5 Drawing Sheets

(51) Int. Cl.
| | |
|---|---|
| *H04W 4/00* | (2009.01) |
| *H04J 11/00* | (2006.01) |
| *H04L 1/18* | (2006.01) |
| *H04L 5/00* | (2006.01) |
| *H04L 27/26* | (2006.01) |
| *H04L 12/803* | (2013.01) |
| *H04L 12/801* | (2013.01) |
| *H04L 29/06* | (2006.01) |
| *H04N 21/2365* | (2011.01) |
| *H04N 21/643* | (2011.01) |
| *H04W 28/02* | (2009.01) |
| *H04W 48/06* | (2009.01) |
| *H04W 52/02* | (2009.01) |
| *H04W 72/04* | (2009.01) |
| *H04B 7/04* | (2006.01) |
| *H04W 88/06* | (2009.01) |

(52) U.S. Cl.
CPC .......... *H04B7/0482* (2013.01); *H04J 11/0046* (2013.01); *H04L 1/0032* (2013.01); *H04L 1/1812* (2013.01); *H04L 1/1861* (2013.01); *H04L 5/0025* (2013.01); *H04L 5/0051* (2013.01); *H04L 5/0092* (2013.01); *H04L 5/0094* (2013.01); *H04L 27/2613* (2013.01); *H04L 47/125* (2013.01); *H04L 47/14* (2013.01); *H04L 63/10* (2013.01); *H04N 21/2365* (2013.01); *H04N 21/64322* (2013.01); *H04W 28/0231* (2013.01); *H04W 48/06* (2013.01); *H04W 52/0203* (2013.01); *H04W 52/0219* (2013.01); *H04W 72/0406* (2013.01); *H04W 72/0413* (2013.01); *H04W 72/042* (2013.01); *H04W 88/06* (2013.01); *Y02B 60/50* (2013.01)

(56) References Cited

U.S. PATENT DOCUMENTS

| | | |
|---|---|---|
| 2007/0283041 A1* | 12/2007 | Chung et al. .................. 709/238 |
| 2009/0318124 A1 | 12/2009 | Haughn |
| 2011/0058531 A1 | 3/2011 | Jain et al. |
| 2011/0110229 A1 | 5/2011 | Himayat et al. |

OTHER PUBLICATIONS

"International Application Serial No. PCT/US2011/066651, Written Opinion mailed Sep. 12, 2012", 4 pgs.

"Universal Mobile Telecommunications System (UMTS); LTE; 3GPP system to Wireless Local Area Network (WLAN) interworking; System description", ETSI TS 123 234, V10.0.0 (3GPP TS 23.234 version 10.0.0 Release 10), (Mar. 2011), 86 pgs.

"Architecture enhancements for non-3GPP accesses", 3GPP TS 23.402 V10.3.0. Technical Specification Group Services and System Aspects. Release 10., (Mar. 2011), 227 pgs.

"International Application Serial No. PCT/US2011/066651, International Preliminary Report on Patentability mailed Nov. 7, 2013", 6 pgs.

"IP flow mobility and seamless Wireless Local Area Network (WLAN) offload; Stage 2", 3GPP TS 23.261 V10.1.0. Technical Specification Group Services and System Aspects. Release 10., (Sep. 2010), 22 pgs.

* cited by examiner

CONTROL AND DATA PLANE SOLUTIONS FOR CARRIER-AGGREGATION BASED WLAN OFFLOAD

PRIORITY CLAIM

This application is a U.S. National Stage Filing under 35 U.S.C. 371 from International Patent Application Serial No. PCT/US2011/066651, filed Dec. 21, 2011, published on Nov. 1, 2012 as WO 2012/148482 A1, which claims priority to U.S. Provisional Patent Application Ser. No. 61/481,024, filed Apr. 29, 2011, both of which are incorporated herein by reference in their entirety.

CROSS-REFERENCE TO RELATED APPLICATIONS

This application is related to the following co-pending, commonly assigned Application: PCT Application No. PCT/US2011/054494, by Etemad et al., entitled "Opportunistic carrier aggregation across WWAN and WLAN systems," filed Oct. 1, 2011, which is incorporated herein by reference in its entirety.

TECHNICAL FIELD

Embodiments pertain to wireless communications. Some embodiments relate to the use of wireless communication standards for wide and local area networks including IEEE 802.11, IEEE 802.16, and 3GPP Long Term Evolution (LTE)/LTE-Advanced (LTE-A), Universal Mobile Telecommunications System (UMTS), and Global System for Mobile communications (GSM).

BACKGROUND

Existing techniques for offloading data traffic and data service flows from a Wireless Wide Area Network (WWAN) (e.g., a 3GPP-LTE or 802.16m (WiMAX) network) to a Wireless Local Area Network (WLAN) (e.g., a Wireless Fidelity (WiFi) 802.11a/b/g/n network) include the static mapping of services to either WWAN or WLAN links. Some network-based offloading techniques, such as those specified in various 3GPP standards, require the client to choose whether to receive a particular service over either a WLAN or WWAN link without coordination between the WLAN and WWAN networks. Additionally, these techniques use IP layer offloading and require interworking between 3GPP and WLAN networks, impacting 3GPP core network elements such as Authentication, Authorization, and Accounting (AAA) servers, the Home Subscriber Server (HSS), policy components, and the like.

Thus, there are general needs for improved methods of coordinating user and control plane solutions for transporting service flows across the WLAN and WWAN networks. There are also general needs for improved methods of controlling WLAN offload based on relevant network conditions and metrics of interest.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Several of the embodiments described herein provide specific techniques for dynamic "radio-level" switching and simultaneous transport of a service flow across WLAN and WWAN links. In particular, this includes implementing offload techniques below the IP layer (e.g., at the data link layer) for controlling and routing service traffic across WLAN and WWAN links. The radio level integration of WLAN and WWAN technologies may be employed to improve user Quality of Service (QoS) and wireless system performance, among other reasons.

In alternate example embodiments, offload techniques are either controlled by a radio link controller using long term network condition measurements (i.e., measurements over a predetermined period of time), or are dynamically scheduled via a scheduler operating at the MAC layer using real-time network condition measurements and feedback. Multiple user plane offload solutions at the IP, PDCP, RLC, and MAC layers may also be specified and implemented in accordance with the techniques described herein.

Carrier aggregation frameworks are presently implemented in various WWAN protocols and typically aggregate traffic flows across multiple carriers in licensed spectrums that support different WWAN protocols (e.g., LTE and High Speed Packet Access (HSPA)). Various carrier aggregation solutions across the WWAN (licensed spectrum) and WLAN (unlicensed spectrum) protocols have been proposed, but fail to provide a robust data offloading solution with specific control and offloading implemented at the data plane or user plane. As an example, carrier aggregation frameworks have been proposed for 4G systems such as 3GPP-LTE Advanced to support the transport of service flows across licensed and unlicensed wireless carriers corresponding to a WWAN and a WLAN. Other existing techniques enable the use of a WLAN as a "virtual channel" or as a part of a multi-protocol communication. Each of these techniques, however, does not fully define the control and data plane methods of managing traffic offload between WWAN and WLAN connections.

Figure 1:
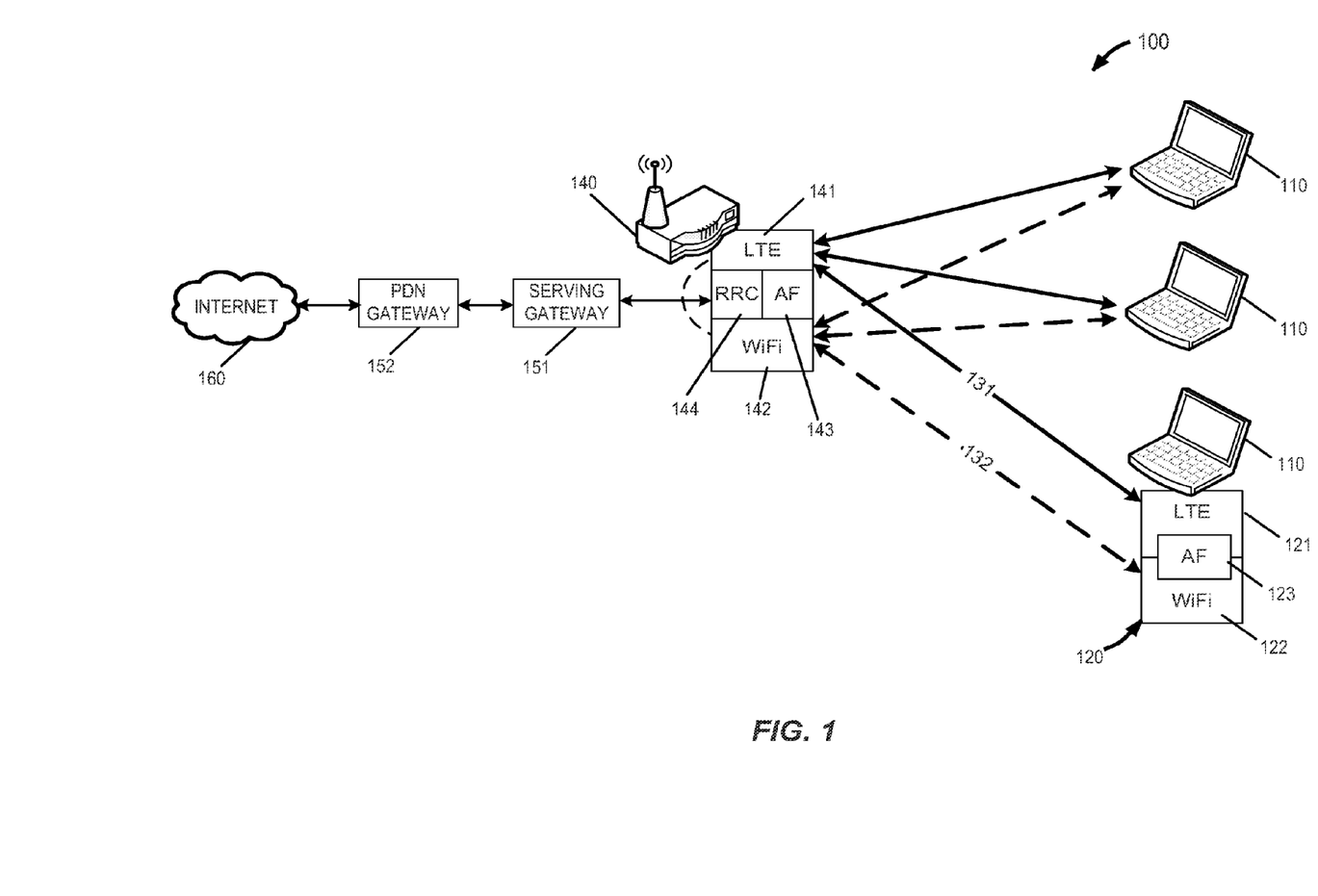
FIG. 1 illustrates a mobile communication framework using WWAN and WLAN networks operating in accordance with some embodiments.

The following disclosure describes an extension of carrier aggregation frameworks to provide specific control and user plane offload solutions for flow transfer (i.e., switching) and aggregation across WLAN and WWAN links. As an example, FIG. 1 illustrates an enhanced network configuration 100 provided in accordance with various implementations of the presently disclosed embodiments. The enhanced network configuration 100 specifically enables WWAN-WLAN coordination for data flow aggregation between a multimode base station 140 and at least one multimode user equipment (UE) 120.

As illustrated, FIG. 1 depicts the interaction between one or more computing devices 110 and a multimode base station 140, each computing device including a multimode UE 120 having WWAN (LTE) and WLAN (WiFi) interfaces 121 and 122. The multimode UE 120 (which includes an aggregation function (AF) 123) is configured to communicate with the multimode base station 140 using a WWAN always-on connection 131 and a WLAN on-demand connection 132, respectively. The multimode base station 140 provides an LTE interface 141 (e.g., an Evolved NodeB (eNodeB) station) and a WiFi interface 142 for communication with the multimode mobile stations 120 via the WWAN always-on connection 131 and the WLAN on-demand connection 132. The multimode base station 140 is further connected to other gateways and interfaces to establish a wide area network connection, such as through connections to serving gateway 151 and packet data network (PDN) gateway 152, for connection to the internet 160 or another wide area network.

The wide area network connection beyond the multimode base station 140 is shared for communications initiated from either the WWAN or WiFi connections 131 or 132. Therefore, in this illustrated embodiment, dual-interface switching may be initiated at the multimode base station 140 using an aggregation function.

In one embodiment, aggregation functionality is provided in the multimode base station with a Multiple Radio Access Technology (Multi-RAT) Aggregation Function interface 143, which is operably coupled to the LTE interface 141 and the WiFi interface 142. The Multi-RAT Aggregation Function interface 143 may be configured to provide offloading of data traffic between the multimode base station 140 and the multimode UE 120 as appropriate from the WWAN to the WLAN. The multimode base station 140 is further configured with a Radio Resource Control (RRC) 144 which may provide control of offloading activity in the Multi-RAT Aggregation Function interface 143 based on QoS or other connection requirements.

As an example, the WWAN may be designated as a primary access providing mobility, security, and state management for network communications with the user terminals 110, while WLAN technology is opportunistically used as a secondary access to provide an additional Layer 2 data pipe for network communications with the user terminals 110. Further, as detailed herein, the RRC 144 within the multimode base station 140 may operate to provide offloading for a single link or multiple links, and may map data flows for offloading at the beginning of or during a session.

In one embodiment, specific user and control plane techniques are deployed for transporting service flows between the WLAN and WWAN carriers at the network layer. At the network layer, each service flow will correspond to a single IP stream of user plane traffic. Options for mapping flows to carriers may be characterized according to whether they allow for a service flow to be carried across a single WLAN or WWAN link at a given time (Flow Switching or Transfer) or whether a both links are aggregated for carrying a service flow (Flow Aggregation). When several flows are present, some of them may be mapped to the WLAN link and others to the WWAN link.

Thus, at least three mapping options for user plane traffic may be employed in connection with the presently described example embodiments. These mapping options provide varying radio link usage for a single service flow (i.e., a single IP stream of user plane traffic) and include:

1) Flow mapping at session establishment (i.e., a Base-line WiFi Offload). With this mapping configuration, a flow is mapped to a single link. Specifically, a service flow is mapped either to a WLAN or WWAN link upon session establishment or when a new flow is created.

2) Flow switching during a session. With this mapping configuration, a flow is mapped to a single link. Specifically, the link carrying the service flow may be switched or changed during the course of session after the flow has been created.

3) Flow aggregation. With this mapping configuration, a flow is mapped to multiple links. Specifically, a single service flow (one IP stream) is mapped to both WLAN and WWAN links.

While use of 3GPP LTE and WiFi standards are illustrated in FIG. 1 and described herein as example WWAN and WLAN protocols, the presently described framework and techniques are applicable to other WWAN mobile broadband standards which support carrier aggregation, such as IEEE 802.16m. Likewise, the WLAN may be established through the use of any number of non-licensed local area or personal-area protocols, and is not limited to use of IEEE 802.11 WiFi standards.

The following data offload techniques generally do not involve modifications or any special implementation within the WLAN air interface. Control of flow mapping and user plane data offload, however, may involve implementation within the WWAN protocol. For example, this may require modifications to the LTE protocol stack and the introduction of additional capabilities in the base station and the UE via a Multi-RAT aggregation function defined for interworking with the WLAN protocol stack.

For example, consider WLAN and WWAN protocol stacks implemented in an example integrated pico/femto multimode base station supporting LTE and WiFi standards, such as multimode base station 140 depicted in FIG. 1. In protocol stacks for a multimode base station 140, the RRC 144 may be configured to manage the multi-carrier resources in the carrier aggregation framework and to activate and deactivate secondary cells (i.e., the WLAN cell with WiFi interface 122) for use based on measurement reports from the users. A MAC layer scheduling function enables dynamic scheduling of per user service flows across the several Hybrid Automatic Repeat Request (HARQ) processes available for use. The scheduler makes its decisions based on buffer status and priorities of the service flows determined under RRC control.

The RRC may be configured for managing the overall carrier-aggregation function over both licensed and unlicensed bands in the WWAN and WLAN interfaces, respectively. However, different options for adjusting flow mapping may be provided to adapt to prevailing link conditions that can supplement the RRC carrier aggregation management functions.

The following provides two example methods of controlling the mapping of service flows across WLAN and WWAN links, which allow for different latencies in adapting service flow mapping based on link quality, network load, interference conditions, or other metrics of interest. The latency in adjusting the mapping of service flows to match link conditions may be determined by the availability of reliable feedback on link conditions.

RRC-Controlled Service Flow Mapping

In one example embodiment, the mapping of service flows to multiple radio links (i.e., the WWAN and WLAN) occurs under control of the RRC. The RRC is configured to collect measurement reports on the WWAN and WLAN links, with these measurements based on user feedback, load or interference reports from neighboring cells, and the like. The RRC may also be made aware of "quality-of-service" requirements of each service flow.

The RRC is configured for adjusting the mapping of flows over the WWAN or WLAN links either upon session establishment or during the course of a session. The RRC may also decide to activate or de-activate the WLAN link for secondary access at any point. The flows mapped over the WLAN link can likewise be transferred or switched to the primary access over the WWAN link.

In order to map or assign the flows over different links, the RRC integrates with a "scheduling function" that can map flows under RRC decisions. This "scheduling function" may be represented by the native MAC scheduling function within the WWAN protocol stack or may be a new function added for managing the WLAN offload. Typically, the measurements received by the RRC do not track the dynamic variations in channel quality of various links but reflect average link conditions. Therefore the flow mappings across various links change on a relatively longer time scale during the course of a session.

The RRC may control the mapping of flows across the WLAN and WWAN links either at the establishment or during the course of a session. For example, the RRC can de-activate/activate WLAN based on "average measurement" during a session and adjust flow accordingly. The latency with which flow mappings react to the changing link conditions may increase, as typically decisions are made on measurements averaged over several hundred seconds. This may result in medium or high off-load latency as compared with the following MAC Scheduler-controlled service flow mapping.

MAC Scheduler-Controlled Service Flow Mapping

In another example embodiment, a MAC Scheduler under control of the RRC provides an alternate control technique for implementing dynamic flow switching and flow aggregation between the WWAN and WLAN links. The MAC Scheduler may utilize "real-time" link quality feedback provided by users on each link, to establish offloading to a higher quality link as appropriate.

The feedback on the WLAN link may be transmitted via the primary WWAN link as specified for intra-RAT carrier aggregation. The scheduler may then use existing HARQ process resources to schedule flows on the WLAN link or simply offload the WLAN traffic without invoking the HARQ context. If the HARQ process is used, the scheduler may restrict re-transmissions over the WWAN link, relying on the native Automatic Repeat Request (ARQ) mechanism available for the WLAN link.

Use of the MAC Scheduler under RRC Control may enable the scheduler to dynamically map a flow to either a WLAN or WWAN link based on "real-time" feedback from a user. This may result in low off-load latency as compared with RRC-controlled service flow mapping.

User Plane Traffic Offload Techniques

Various embodiments of base station and UE devices may implement techniques to offload WWAN data traffic to a WLAN. In one example embodiment, once the traffic is transferred to the WLAN interface, the data is transported transparently (i.e., tunneled) via the Layer 2 transport provided by the WLAN link between the base station and the UE. The WLAN driver may segregate WWAN-offloaded traffic at the UE based on the source MAC address of the WLAN base station radio. (This MAC address may be added on all data packets sent over the WLAN interface.) A Multi-RAT aggregation function as previously described may serve to interwork between the WLAN and WWAN protocol stack. Once transported to the corresponding base station or UE, the data may be transferred to and processed by the appropriate WWAN interface.

Figure 2:
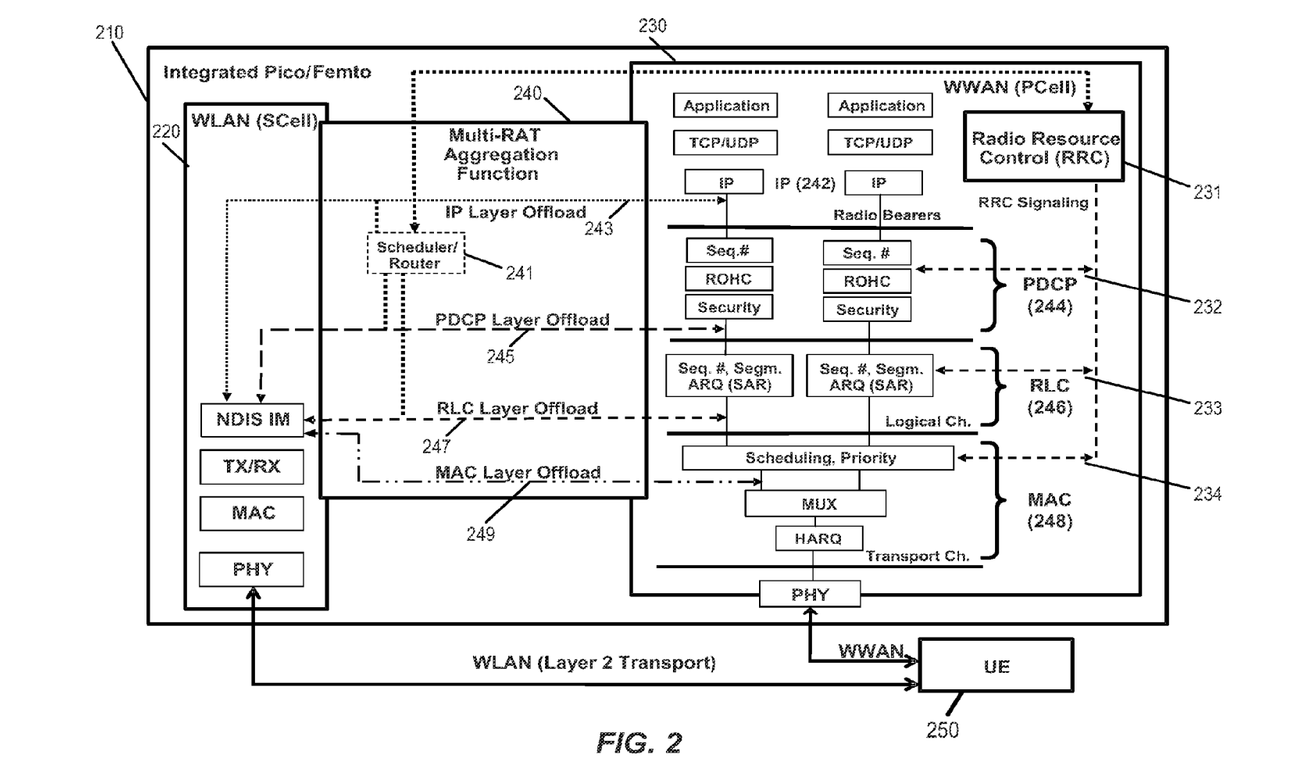
FIG. 2 illustrates a data plane view of a WLAN and WWAN protocol stack within a multimode mobile station configured for RRC-controlled offload with different traffic offload options according to one embodiment.
Figure 3:
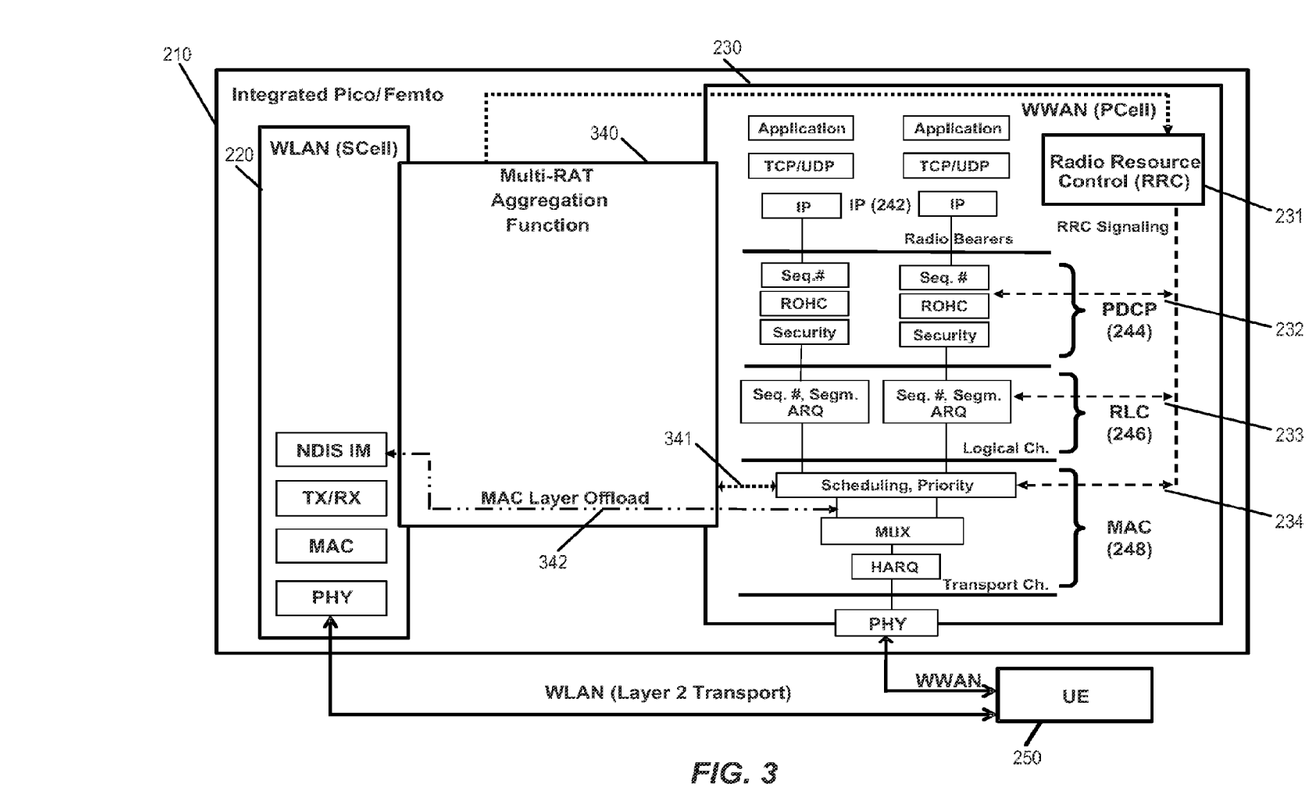
FIG. 3 illustrates a data plane view of a WLAN and WWAN protocol stack within a multimode mobile station configured for MAC Scheduler-controlled dynamic flow switching and aggregation according to one embodiment.

The previously described RRC-controlled and MAC Scheduler-controlled service flow mappings may be accompanied by specific device configurations to provide data offloading to a WLAN interface. FIG. 2 illustrates the use of RRC-controlled offload with a series of traffic offload options from various layers of the WWAN network stack (e.g. using IP Layer offload; PDCP Layer Offload; RLC Layer Offload; and MAC Layer Offload), according to one embodiment. FIG. 3 illustrates dynamic flow switching and aggregation, managed by the MAC Scheduler under control of the RRC, according to one embodiment.

RRC-Controlled Data Traffic Offload Techniques

FIG. 2 provides an illustration of a user plane for a multimode base station 210 embodying a WLAN secondary cell (SCell) 220 and a WWAN primary cell (PCell) 230 according to one example embodiment. As a further example, in a LTE or LTE-A setting, the primary cell 230 may be operably coupled to a transceiver (not shown) configured to perform multiple-input multiple-output (MIMO) beamforming, to communicate with an orthogonal frequency division multiple access (OFDMA) broadband wireless access network. As another further example, secondary cell 220 may be operably coupled to a Wireless Fidelity (WiFi) transceiver (not shown), to communicate with a WLAN operating according to an IEEE 802.11 standard.

Within the WWAN primary cell 230, a RRC 231 provides signaling for control of the various layers, including PDCP layer signaling 232, RLC layer signaling 233, and MAC layer signaling 234. The WLAN secondary cell 220 and the WWAN primary cell 230 may connect via a Layer 2 transport to UE 250 via WLAN and WWAN wireless links, respectively.

The multimode base station 210 further includes a multi-RAT aggregation function 240, which exists to provide offloading from the WWAN primary cell 230 to the WLAN secondary cell 220. The multi-RAT aggregation function 240 further provides a scheduler or router 241, which is used to schedule and route flows across users to the WLAN link. The multi-RAT aggregation function 240 is configured to communicate both with the WWAN primary cell 230 to the WLAN secondary cell 220, to provide user plane traffic offloading of data transferred to the UE 250, and reloading of offloaded data received from the UE 250 via the WLAN secondary cell 220.

As depicted in FIG. 2, user plane traffic can be offloaded at various depths within the protocol stack with the assistance of new functionalities introduced within the Multi-RAT aggregation function 240. For example, traffic can be offloaded at the IP layer 242, PDCP layer 244, RLC layer 246, or MAC layers 248 within the WWAN primary cell 230 protocol stack. The specific layer used for offloading may depend on tradeoffs resulting from system performance, offload latency, and implementation and storage complexity.

Using the lower levels of the protocol stack to offload traffic intended for the WLAN link may allow for significantly more reuse of the existing WWAN protocol functions, while introducing tighter coupling between the WWAN and WLAN stacks. Offloading at a higher layer, such as with IP layer offloading 243, can avoid tight coupling of the WLAN and WWAN protocol stacks and allow for easier implementation of offloading. In some settings, the reuse of existing WWAN functions may be limited; hence, these functions may need to be re-implemented within the Multi-RAT aggregation function 240.

Offloading WLAN traffic below the IP layer 242 (e.g., with PDCP layer offloading 245, RLC layer offloading 247, or MAC layer offloading 249) implies that additional functions like security, in-sequence delivery, flow aggregation, and the scheduling function will be implemented with the Multi-RAT aggregation function 240. With use of IP layer offloading 243, however, the WWAN security keys may be used together with the WLAN encryption functions to simplify the implementation of security features.

Offloading WLAN traffic below the PDCP layer 244, for example, may allow for LTE security functions to be reused for encrypting the traffic offloaded to WLAN. However, modifications to the PDCP in-sequence delivery functions and implementation of a scheduling function may be needed to enable the flow switching option. Further, the LTE segmentation and re-assembly functions may need to be duplicated to support the flow aggregation option via this method.

Offloading WLAN traffic below the RLC layer 246, for example, allows for reuse of in-sequence delivery and flow aggregation within the LTE protocol stack to enable both the flow switching and aggregation functions.

Offloading the WLAN traffic at the MAC layer 248, for example, implies that functions like security, in-sequence delivery, segmentation, and the re-assembly and "scheduling" of traffic can all be achieved via the native capabilities of the LTE protocol stack. However, the LTE protocol stack may need to be tuned to account for longer latencies on the WLAN side.

MAC Scheduler Controlled Data Traffic Offload Techniques

FIG. 3 provides an illustration of a user plane for a multimode base station 210 embodying a WLAN secondary cell (SCell) 220 and a WWAN primary cell (PCell) 230 according to one embodiment, configured to enable dynamic flow switching/aggregation of a service flow across the WLAN and WWAN links. Similar to FIG. 2, the multimode base station 210 includes a Multi-RAT aggregation function 340 which exists to provide offloading from the WWAN primary cell 230 to the WLAN secondary cell 220. However, Multi-RAT aggregation function 340 is configured to perform data offloads exclusively with MAC layer offloading 342 by pushing control of flow mapping decisions and data offloads to the MAC layer 248.

Since the control of the flow mapping decision is pushed to the MAC layer, only the MAC layer offloading option is feasible. With MAC layer offloading, the offload conducted by the Multi-RAT Aggregation Function 340 is controlled by a MAC scheduling function 341, and relies on real time feedback from the users to enable dynamic adaptation of traffic flows between WLAN and WWAN links. Since the MAC Scheduler controls offload decisions, the MAC layer offload is used to send WLAN data traffic, by using the existing stop-and-wait HARQ protocol.

As the RLC layer 246 handles in-sequence delivery and segmentation and re-assembly functions, MAC layer offloading can accommodate both flow switching and aggregation without requiring any additional functionality from the Multi-RAT aggregation function 340. Although the typical WLAN and WWAN MAC transmission latencies are very different, the RLC layer 246 has the capability of providing buffering and reordering capability to match the "best-effort" application layer characteristics for most service classes that are likely to benefit from WLAN offloading.

While an implementation using a MAC Scheduler-controlled offload of data provides some benefits, this implementation also introduces tighter coupling between the operation of the WLAN and WWAN protocol stacks. For example, this option will require faster feedback on the WLAN link compared to some existing techniques. For example, a system configuration may need to include additional feedback on the LTE UE physical feedback channels to support the WLAN link.

Feedback

The RRC and the MAC Scheduler may use several methods for obtaining user or network condition feedback, which is useful to determine whether to begin, continue, or discontinue offloading of data to a secondary network link. The feedback on the secondary network link may be reported over the primary network link in a similar fashion as reported by secondary cells in the existing carrier aggregation framework.

The granularity and method of feedback can be matched to the offload control option being used. For example, RRC layer measurements may be reported via RRC signaling, while the feedback needed for the MAC Scheduler-controlled offload may be signaled as fast Channel Quality Indication (CQI) feedback over the primary network link. New feedback metrics and feedback transport mechanisms specific for WLAN resources may also be specified for this purpose. Example feedback can include rate, MIMO rank, Packet Error Rate (PER), application quality, and so forth.

Signaling for Indicating Secondary Network Offload

In connection with the aforementioned data offload technique controlled by the RRC, the activation and de-activation of the secondary cell can indicate whether a particular service flow will be carried over the secondary network link. Existing signaling defined for carrier activation and de-activation can easily be reused for this purpose (for example, via the RadioResourceConfiguration message in 3GPP Specification 36.331). Additional RRC messaging can also be defined (or reused) to indicate the "reconfiguration" in the mapping of a service flow.

In connection with the aforementioned data offload technique controlled by the MAC Scheduler, the existing Layer 2 downlink control channels may be used to indicate whether the UE should listen on the WLAN link for particular traffic (for example, the Downlink Control Format Indicator may be modified for signaling a WLAN resource). This notification is not explicitly needed as the traffic received over a WLAN link can simply be routed to the appropriate receiving layer on the WWAN side. However, having a signaling notification can assist with the routing process and can also help with saving power by shutting down WLAN processing if no data transmission is expected to occur over the WLAN link. Similarly, on the Uplink, the MAC Scheduler can use the uplink Layer 2 control channels to indicate the bandwidth allocation for the user on a specific radio link.

Figure 4:
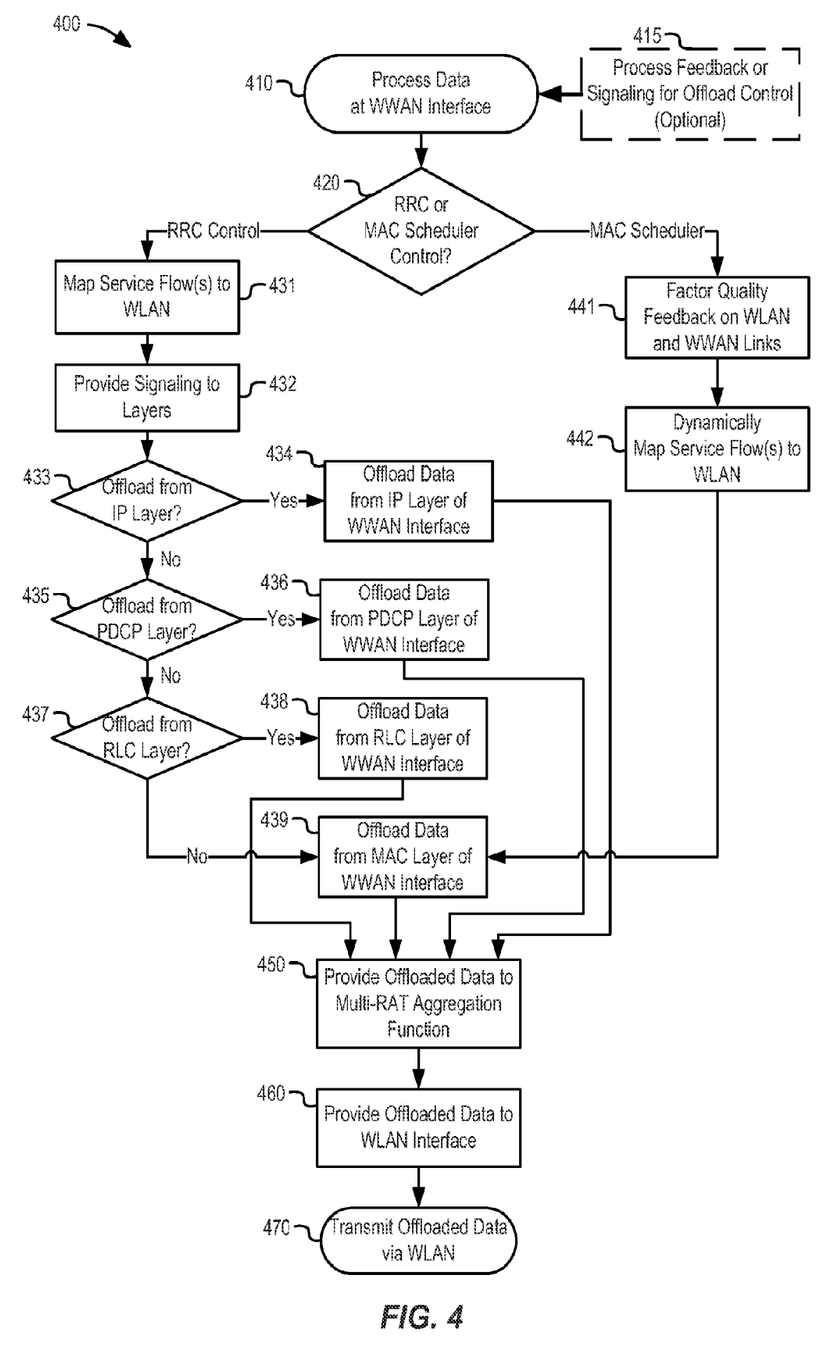
FIG. 4 is a flow diagram illustrating a method for dynamic flow switching and aggregation with transmitting data offloaded to a WLAN according to one embodiment.

FIG. 4 provides a flowchart illustrating an example method 400 for offloading and transmitting offloaded data from a primary network (e.g., a WWAN) to a secondary network (e.g., a WLAN), using a series of operations performed at a communicating device (which may be either a base station or UE). As depicted, data for transmission over the network is received and processed at a primary network interface (e.g., a WWAN interface) of the communicating device in operation 410. In some embodiments, whether to implement offload control is determined as a result of network condition feedback or offload signaling processed in operation 415. For example, the determination of congested network conditions on a primary network link may be based on reporting received at the communicating device. Likewise, the communicating device may receive signaling that a particular service flow has been mapped in part or in whole to the secondary network.

While the figure illustrates a fully configurable implementation across various options, in practice, one specific combination of control and data plane offload solutions may also be implemented based on specific implementation and performance tradeoffs. The following operations will vary depending on whether the primary network interface is under the control of the communicating device's RRC or a MAC Scheduler as determined in operation 420.

For cases where the communicating device is under RRC control, the RRC will provide various commands to map and offload the data flow from a specific layer of the primary network interface. The RRC will map specific flows to the secondary network link during either the session establishment or during the course of the session (operation 431), based on, for example, measurement reports, QoS requirements, or feedback received at the RRC.

The RRC will then provide signaling to the appropriate user plane layer(s) to implement offloading of the data flow in operation 432. If the RRC provides signaling to offload from the IP Layer in operation 433, then the data will be offloaded from the IP layer of the primary network interface in operation 434. If the RRC provides signaling to offload from the PDCP Layer in operation 435, then the data will be offloaded from the PDCP layer of the primary network interface in operation 436. If the RRC provides signaling to offload from the RLC layer in operation 437, then the data will be offloaded from the RLC layer of the primary network interface in operation 438. If IP, PDCP, or RLC offloading is not specified, then data will be offloaded from the MAC layer of the primary network interface in operation 439. (Although not illustrated, MAC layer offloading may also be specified through specific signaling from the RRC).

For cases where the communicating device is under MAC Scheduler control as determined in operation 420, the MAC Scheduler will dynamically map service flows and offload data from any mapped flows from the MAC layer. In one example embodiment, the MAC Scheduler factors quality feedback on the secondary network or primary network links to determine whether to perform offloading in operation 441. The MAC Scheduler may then dynamically map one or more service flows to the secondary network link in operation 442 and offload the data from the MAC layer of the primary network interface.

Offloaded data is provided from the signaled user plane layer to the Multi-RAT aggregation function in operation 450. The offloaded data is then provided from the Multi-RAT aggregation function to a secondary network interface (e.g., a WLAN interface) in operation 460. The offloaded data is then transmitted over a Layer 2 (data link layer) connection via the secondary network from the communicating device in operation 470. The offloaded data is then received via the secondary network at a receiving communication device (either a base station or UE), and may be translated using the following method.

Figure 5:
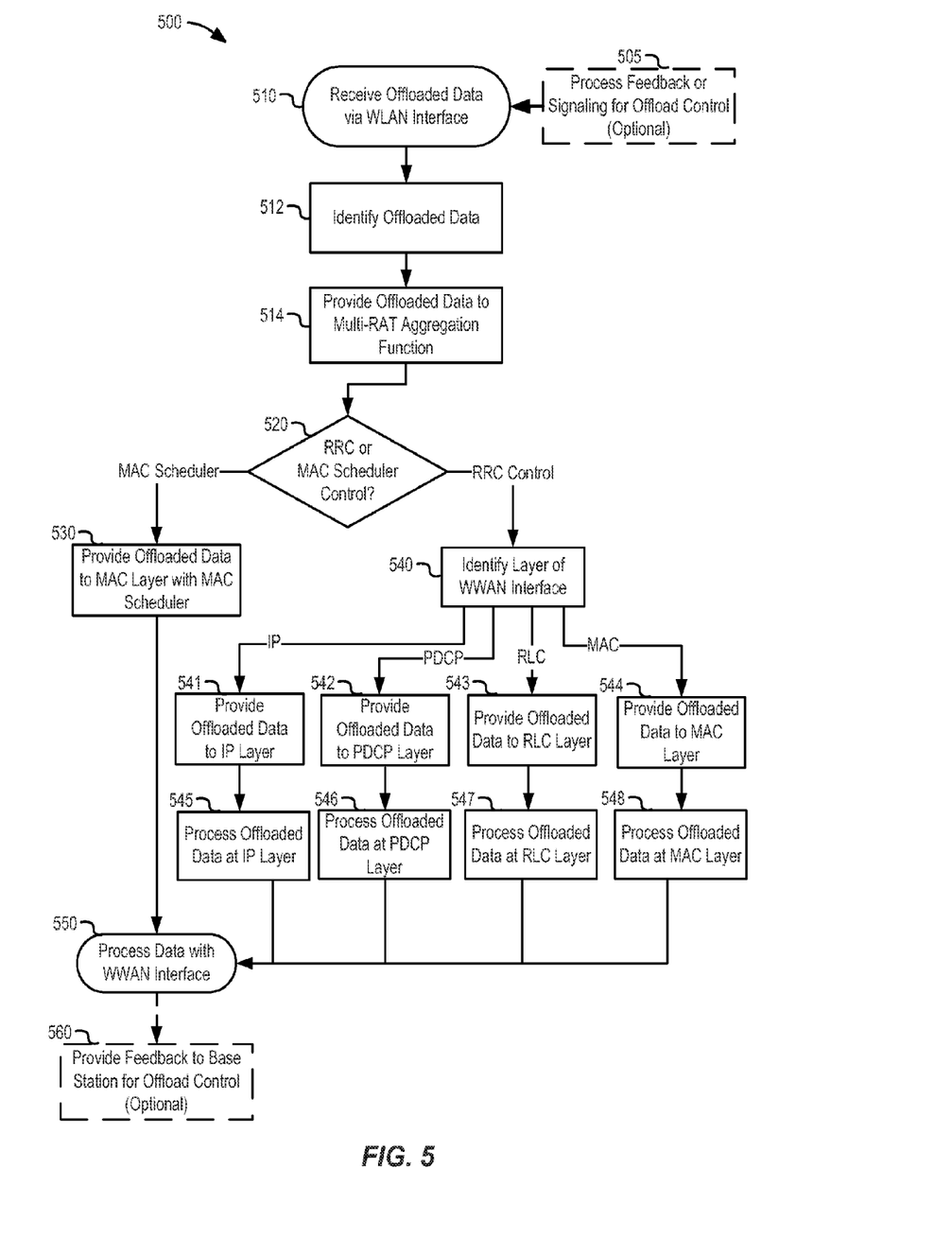
FIG. 5 is a flow diagram illustrating a method for dynamic flow switching and aggregation with receiving data offloaded from a WLAN according to one embodiment.

FIG. 5 provides a flowchart illustrating an example method 500 for receiving and processing offloaded data from a secondary network (e.g., a WLAN), using a series of operations performed at a communicating device (which may be either a base station or UE). As depicted, data received from the secondary network is received at a secondary network interface (e.g., a WLAN interface) of the communicating device in operation 510. The data is identified as being offloaded in operation 512, as a result of one or more identifiers presented within the received data, or as a result of feedback, signaling, or other indications provided to the communicating device.

Such feedback or signaling may be processed by the communicating device, as in operation 505, prior or concurrent to the receipt of the offloaded data.

After the received data is identified as being offloaded data, the offloaded data will be provided to the Multi-RAT aggregation function as in operation 514. The Multi-RAT aggregation function will then operate to provide the offloaded data to the appropriate layer of the primary network interface (e.g., a WWAN interface). The following operations will vary depending on whether the Multi-RAT aggregation function is under the control of the communicating device's RRC, or a MAC Scheduler, as determined in operation 520.

For cases where the communicating device is under MAC Scheduler control as determined in operation 520, the offloaded data may be recognized as being offloaded from the MAC layer. Therefore, the data may be directly provided to the MAC layer of the primary network interface using the MAC Scheduler as in operation 530. The offloaded data may then be processed further at higher levels of the user plane with the primary network interface in operation 550.

For cases where the communicating device is under RRC control as determined in operation 520, then the user plane layer to reintegrate the offloaded data to is identified as in operation 540. If the identified layer of the offloaded data is the IP layer, the offloaded data may be provided to the IP layer of the primary network interface from the aggregation function using RRC signaling in operation 541 and processed at the IP layer in operation 545. If the identified layer of the offloaded data is the PDCP layer, the offloaded data may be provided to the PDCP layer of the primary network interface from the aggregation function using RRC signaling in operation 542 and processed at the PDCP layer in operation 546. If the identified layer of the offloaded data is the RLC layer, the offloaded data may be provided to the RLC layer of the primary network interface from the aggregation function using RRC signaling in operation 543 and processed at the RLC layer in operation 547. If the identified layer of the offloaded data is the MAC layer, the offloaded data may be provided to the MAC layer of the primary network interface from the aggregation function using RRC signaling in operation 544 and processed at the MAC layer in operation 548. Once loaded into the primary network interface, the offloaded data may then be processed further at higher levels of the user plane in operation 550.

In the cases where the communicating device is UE, the UE may also be configured to provide feedback to the transmitting base station in operation 560. This feedback may include network condition values and network performance condition values for use in connection with offload control. For example, the base station may use feedback to determine whether more or less offloading to the secondary network should be implemented.

Although the configurations described herein generally provide examples of data offloading from a WWAN to a WLAN, like techniques are equally applicable to provide data offloading back from a WLAN to a WWAN, dependent on network conditions, defined configurations, signaling, reporting values, or network and equipment specifications. Further, the term "primary network" as used herein is not necessarily limited to a WWAN configuration; likewise, the term "secondary network" as used herein is not necessarily limited to a WLAN configuration. Other network configurations may be included within the scope of the presently described networks.

Those skilled in the art would understand that the presently described techniques may be used in a variety of multi-communication UE devices with 3G/4G (including UMTS or GSM) and WiFi Capabilities, as well as integrated multi-radio base-stations. For example, a multi-communication UE device may be included in a mobile device such as a smartphone or tablet personal computer, that may comprise one or more of a keyboard, a display, a non-volatile memory port, multiple antennas, a graphics processor, an application processor, speakers, and other mobile device elements. The display for such mobile device may be a liquid crystal display (LCD) screen including a touch screen.

References to LTE used herein may refer to 3GPP-LTE, 3GPP-LTE-A, and other 4G telecommunications standards. While this disclosure illustrates various control plane and user plane offload techniques using the LTE and the WiFi protocol stack, the techniques are equally applicable in other carrier aggregation frameworks.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the base station or the UE may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. User equipment comprising physical-layer circuitry configured to process offloaded data received via a secondary network, comprising:
    physical layer circuitry providing a primary network interface;
    physical layer circuitry providing a secondary network interface; and
    physical-layer circuitry configured to process offloaded flows of data received via the secondary network using an aggregation function, the aggregation function transferring data between the primary network interface and the second network interface, and the circuitry configured for:
        identifying flows of data at a Layer 2 level received with the secondary network interface as offloaded data from the primary network tunneled over a secondary network;
        processing the offloaded data with the aggregation function;
        providing the offloaded data from the aggregation function to a user plane layer of the primary network interfaces; and
        processing the offloaded data with the primary network interface.

2. The user equipment of claim 1, wherein the secondary network is a Wireless Local Area Network (WLAN) operating according to a standard from the IEEE 802.11, standards family, and wherein the primary network is a Wireless Wide Area Network (WWAN) operating according to a standard from the IEEE 802.16, 3GPP Long Term Evolution (LTE), 3GPP Long Term Evolution Advanced (LTE-A), Universal Mobile Telecommunications System (UMTS), or Global System for Mobile communications (GSM) standards families.

3. The user equipment of claim 1, the circuitry further configured for providing feedback to a base station for control of data offloading to the secondary network.

4. The user equipment of claim 1, the circuitry further configured for receiving one or more signals at the secondary network interface, the signals providing a notification of data offloading to the secondary network.

5. The user equipment of claim 4, wherein the signals are provided in a downlink control format indicator.

6. The user equipment of claim 4, wherein the user equipment is included in a mobile device comprising a touch screen display.

7. A method for processing data offloaded from a primary network, the method comprising operations performed at user equipment, and the operations including:
    identifying data at a Layer 2 level of a secondary network interface as offloaded data from a primary network tunneled over a secondary network;
    providing the offloaded data from the secondary network interface to an aggregation function;
    transferring the offloaded data to a layer of a primary network interface using the aggregation function; and
    processing the offloaded data with the primary network interface.

8. The method of claim 7, further comprising:
    identifying the layer of the primary network interface to receive the offloaded data, the layer selected from an IP layer, PDCP layer, RLC layer, or MAC layer;
    wherein the aggregation function is under control of a Radio Resource Control (RRC) of the primary network interface, and wherein the aggregation function is signaled from the RRC to transfer the offloaded data to the identified layer.

9. The method of claim 7, further comprising:
    providing feedback to a base station for control of offloading data to the secondary network interface.

* * * * *